United States Patent [19]

Dirscherl et al.

[11] Patent Number: 4,988,058
[45] Date of Patent: Jan. 29, 1991

[54] METHOD AND APPARATUS FOR STEERING MOVING OBJECTS

[75] Inventors: Reinhard Dirscherl, Taufkirchen; Ernst Lill, Munich, both of Fed. Rep. of Germany

[73] Assignee: Messerschmitt-Boelkow-Blohm GmbH, Munich, Fed. Rep. of Germany

[21] Appl. No.: 397,719

[22] Filed: Aug. 23, 1989

[51] Int. Cl.$^5$ .............................................. F41G 7/26
[52] U.S. Cl. .................................................. 244/3.16
[58] Field of Search .................. 244/3.1, 3.11, 3.14, 244/3.15, 3.16

[56] References Cited

U.S. PATENT DOCUMENTS 4,406,429 9/1983 Allen .................................. 244/3.11

FOREIGN PATENT DOCUMENTS 2931321 5/1982 Fed. Rep. of Germany .
2944261 7/1986 Fed. Rep. of Germany .
57-188810 5/1984 Japan .................................. 244/3.16

Primary Examiner—Charles T. Jordan
Assistant Examiner—Richard W. Wendtland
Attorney, Agent, or Firm—W. G. Fasse; D. H. Kane, Jr.

[57] ABSTRACT

A method and apparatus for steering a moving object is based on an electro-optical sensor unit which selectively detects the UV-radiation generated by a flying body or projectile. The signals resulting therefrom are processed and converted by a computer into steering and control signals for the object to be steered, whereby the locating probability and the interference reliability are improved.

21 Claims, 9 Drawing Sheets

Fig. 6
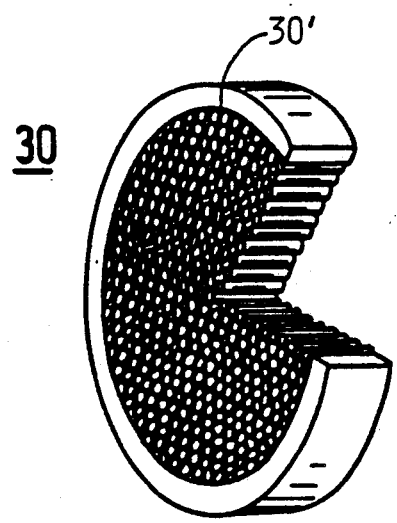
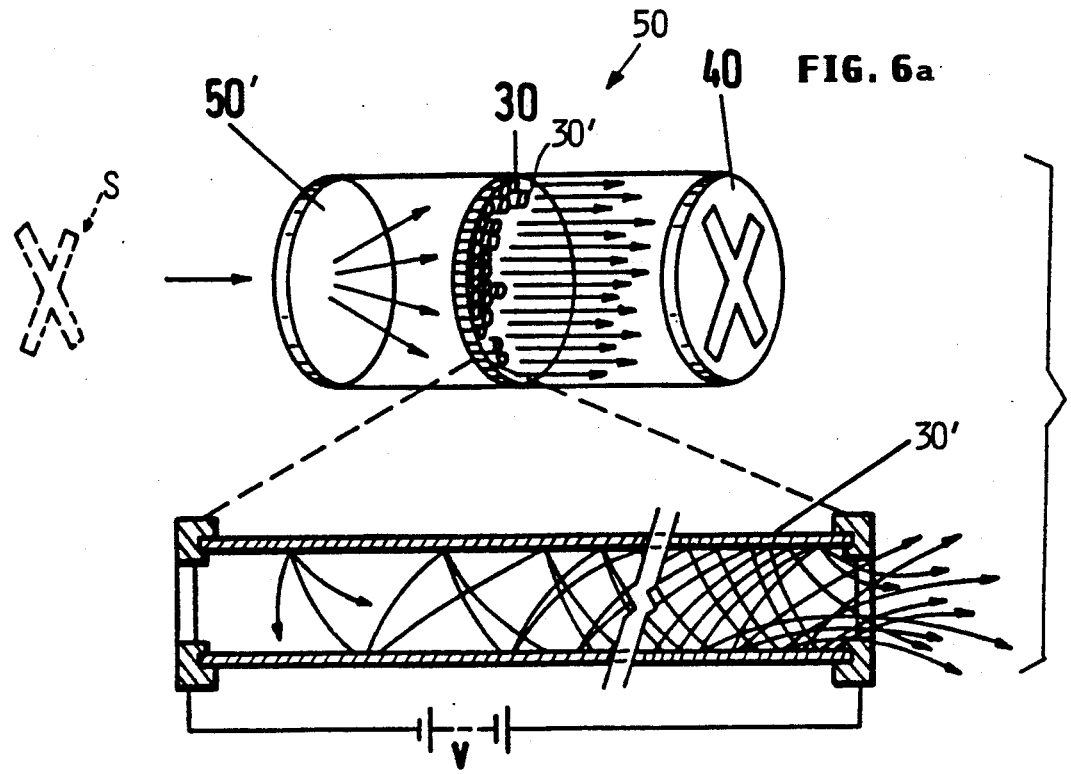
FIG. 6a

METHOD AND APPARATUS FOR STEERING MOVING OBJECTS

FIELD OF THE INVENTION

The invention relates to a method and an apparatus for steering of moving objects.

BACKGROUND INFORMATION

The detection of a radiation emanating from a tracer flare of a flying body, by means of a point detector and evaluation of the measured signals in an evaluating electronic means is known from the German Patent Publication No. 2,944,261. The detector system in the known device serves for guiding the flying body along an optical axis. The known methods of steering flying bodies use detectors which essentially function in the infrared range. In the German Patent Publication No. 2,944,261 the point detector is supposed to measure the intensity of a radiation largely independently of the spectral range. For measuring the intensity, modulation signals are generated by means of a modulator disk out of consecutive impulses following one another without interruption. Only the modulated signal is then processed in the evaluating electronic circuitry for separating the flying body tracer flare from interference radiators.

OBJECT OF THE INVENTION

It is the object of the invention to provide a method for recognizing and locating, as well as steering, moving objects, whereby to provide an increased reliability against interference.

SUMMARY OF THE INVENTION

With the new sensor it is possible to obtain and use a binary image for recognizing a flying body or other objects. Because the sensor is blind in the UV solar radiation range and the sun forms the only natural background radiation source, the sensor can reliably recognize a flying body or a similar object in front of a practically black background. The attained binary image, light/dark or black/green, therefore clearly contrasts the UV radiation source on or in the flying body or similar object from the background. Thus, the interferability by thermal radiators is blocked. Movable parts such as, for example, a modulator disk or costly sampling or scanning arrangements are not necessary. The steering signals may be obtained in real time by means of a computer, whereby the steering may be achieved in a manner known as such, by means of a steering wire, steering glass fiber conductor, or a guide beam method, compare German Patent Publication No. 2,931,321.

The recognition system according to the invention with the new UV radiation sensitive detector can advantageously detect the UV signature of the exhaust gas stream of a flying body engine. The size and variation of the exhaust gas stream in time with the speed of the flying body is known and is stored in the computer.

The signature of the exhaust gas stream (plume) can also purposefully be influenced, with reference to the emitted power and spectral distribution, in the ultraviolet spectral range by means of fuel additives.

Advantageously, an additional chemical UV radiation source of a pyrotechnical type, for example, in the form of a cartridge or the like, may be attached to the object.

A special electrical pulsable UV radiation source attached to the object, is also advantageously usable and easily controllable.

BRIEF DESCRIPTION OF THE DRAWINGS

Example embodiments of the invention are described below with reference o the accompanying drawings, wherein:

FIG. 6 is a perspective view of a micro-channel plate as used in FIGS. 5a and 6a;

FIG. 6a shows an electron multiplier tube including a micro-channel plate as shown in FIG. 6;

DETAILED DESCRIPTION OF PREFERRED EXAMPLE EMBODIMENTS AND OF THE BEST MODE OF THE INVENTION

Figure 1:
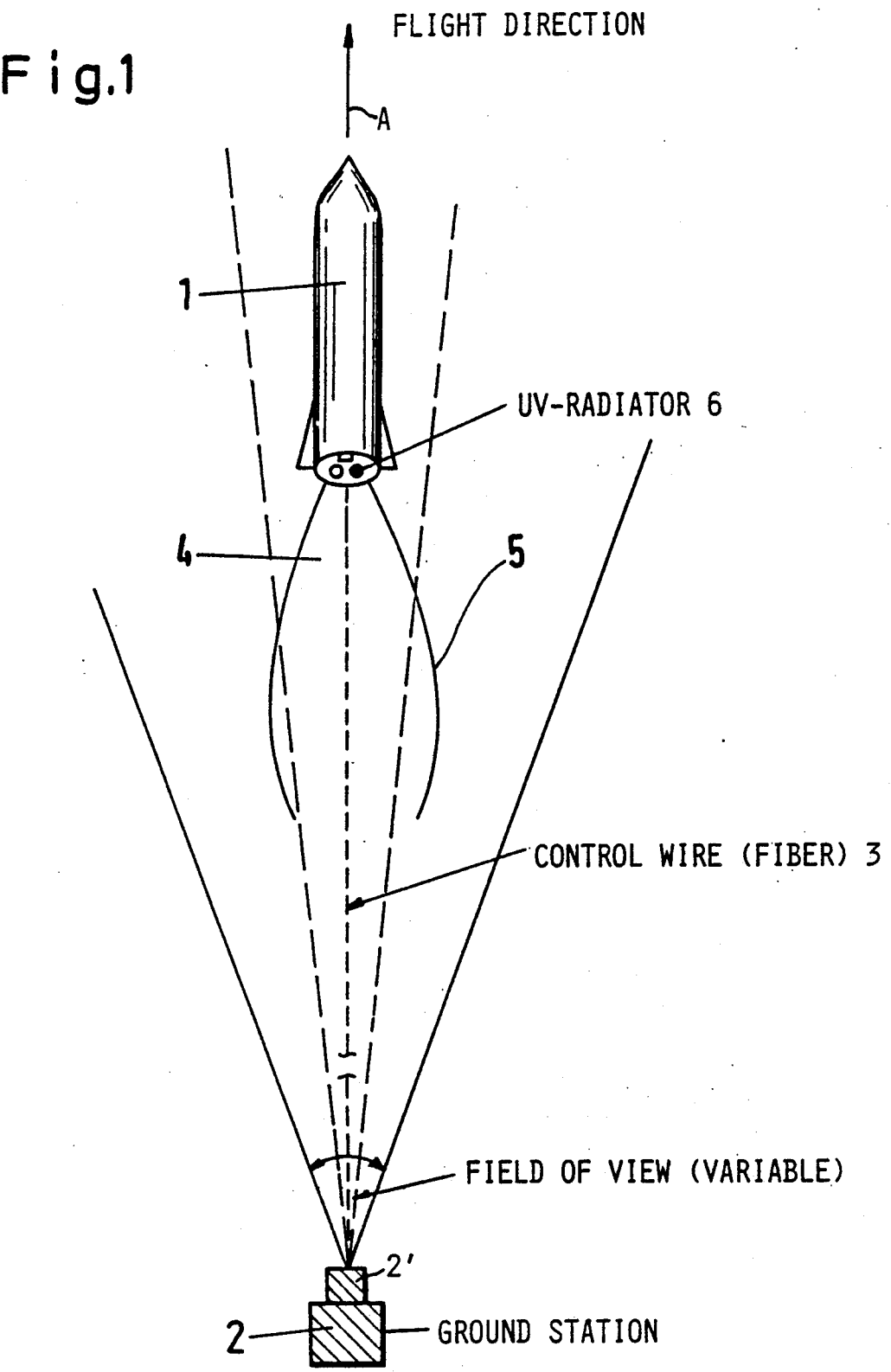
FIG. 1 Illustrates a principle arrangement of a flying body steering and locating system with a suitable ground station.

FIG. 1 shows the flying body 1, for example a rocket, with an activated engine of which the reaction thrust or exhaust gas stream 4 may be used for locating and guidance. The exhaust gas stream 4 is larger than the diameter of the flying body 1 for certain rockets, be they propelled by liquid propellant or solid propellant.

Known flying bodies have a known specific UV-signature or characteristic of the plume 5. Such characteristics may be stored and then compared to the values measured by the sensor for recognition. In this context it is advantageous for recognition to utilize the known acceleration and/or velocity of the known flying body 1 and therewith the size and intensity reduction, especially of the diameter, of the exhaust gas stream or its UV-plume 5. Moreover, the wave length specific intensity characteristic is typical, and when using a UV-radiator 6 separate from the engine, a pulsation or modulation can additionally facilitate the recognition. In a few cases the exhaust gas stream 4 and therewith the UV-signature has a special flying body characteristic modulation due to the self-rotation of the flying body, for example, with two or more engines and/or immersion of the rudder into the exhaust gas stream.

In the drawing of an example embodiment, a flying body 1 moves away from a ground station by 2. The ground station 2 includes an electro-optical section 2 of the recognition and detector or locating system. The ground station also includes a generating system for the steering commands combined with possibly only one computer unit. The field of view of the ultraviolet sensitive sensor is desirably selectable within relatively large limits.

The flight direction is shown in FIG. 1 by an A arrow at the nose of the flying body 1, as well as its major axis in which, for example, a steering beam or a steering wire or a light conducting fiber 3 may be guided. The flying body 1 may also be steered by other means from the ground. A UVA radiator 6 may be separately attached to the flying body 1. The radiator 6 can be of a chemical type, a pyrotechnical type, or an electric type and respectively form a compact, self-contained, exchangeable unit such as a cartridge. The engine may also be embodied as a chemical or pyrotechnical reaction thrust engine, especially with a solid propellant composition or a liquid propellant composition, in order to radiate special ultraviolet rays to form the plume 5. Chemical additives may be mixed into the propellant of the engine so that the plume has strong UV-components. Magnesium, aluminum, or similar metallic powders are suitable as additives for this purpose which is known as such.

Suitable ultraviolet radiation sources are also known, either as discharge lamps, for example with a hollow cathode such as mercury vapor lamps, or as UV-tubes or lamps with a plasma discharge. The electrically controlled UV-radiators 6 may be especially easily clocked, pulsed or coded or modulated in any manner known for achieving this purpose.

Figure 2:
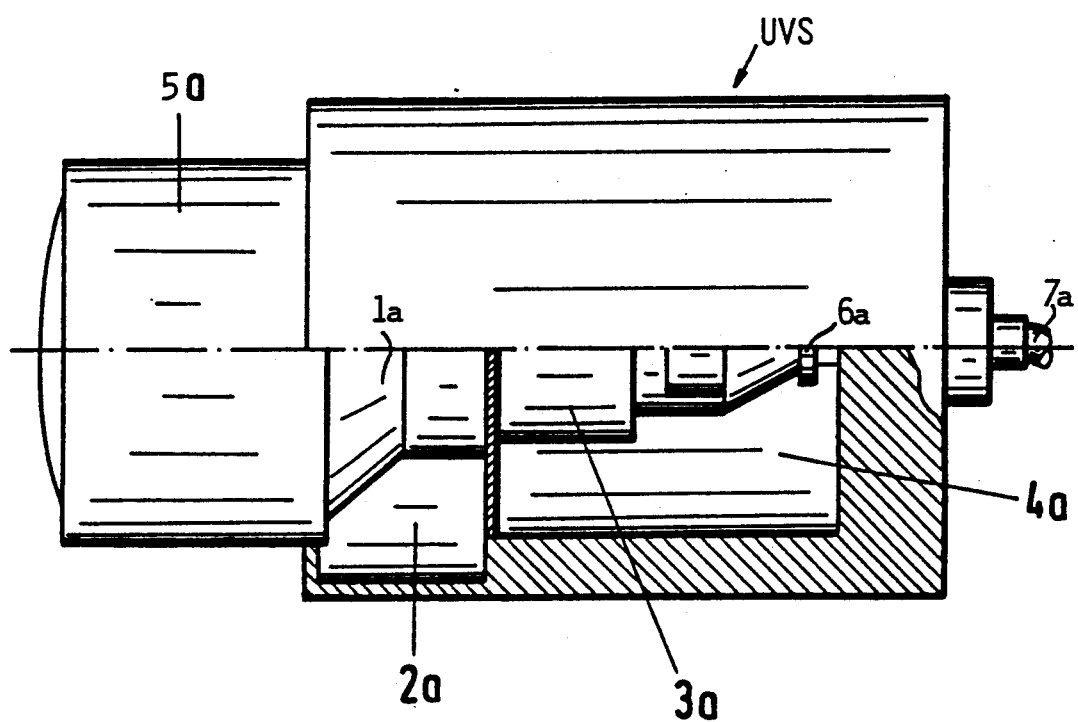
FIG. 2 is a partially sectional view of a UV radiation sensor with its main components arranged in a housing forming part of the ground station of the present system.

The UV-sensor UVS used according to the invention in the section 2' of the ground station 2 is shown in FIG. 2. The components of the sensor UVS are selected to have a high quantum efficiency with a simultaneous high amplification factor and a large pixel count, especially over 300,000. These UV-sensor components 1a also referred to as input optics 1a, in contrast to infrared detectors, have a low inherent noise without requiring any cooling, that is to say the signal to noise ratio relative to the background is considerably better. Because of that, and due to the small wave length of the UV-radiation, a high locating resolution and a high detection speed result while the UV-sensors is of small size. The UV-sensor component 1a according to the invention advantageously allows operation in various spectral ranges through the use of exchangeable filters 5a so that the UV-image amplifier 3a may simultaneously also be used in the visible and near infrared range as an image sensor through the use of a suitable broad-band photo-cathode. Even UV-radiators 6 with a relatively small intensity, in any event smaller than in the IR-range, can also be detected by the sensor according to the invention.

As FIG. 2 shows, the UV-sensor comprises input optics 1a having an optimal transmission in the visible and/or solar blind range. Further, the input optics 1a are selected so that they have a field of view which at a large distance, for example 5 km or more, still retains a sufficiently high resolution in order to achieve an exact steering of the body 1 to the target by means of electronic or mechanical zoom or exchangeable revolving objectives. One or more exchangeable filters 5a are advantageously arranged in front of the photo-sensitive input 1a in order to suppress all undesirable wave lengths and to optimally transmit the selected wave length.

Figure 7:
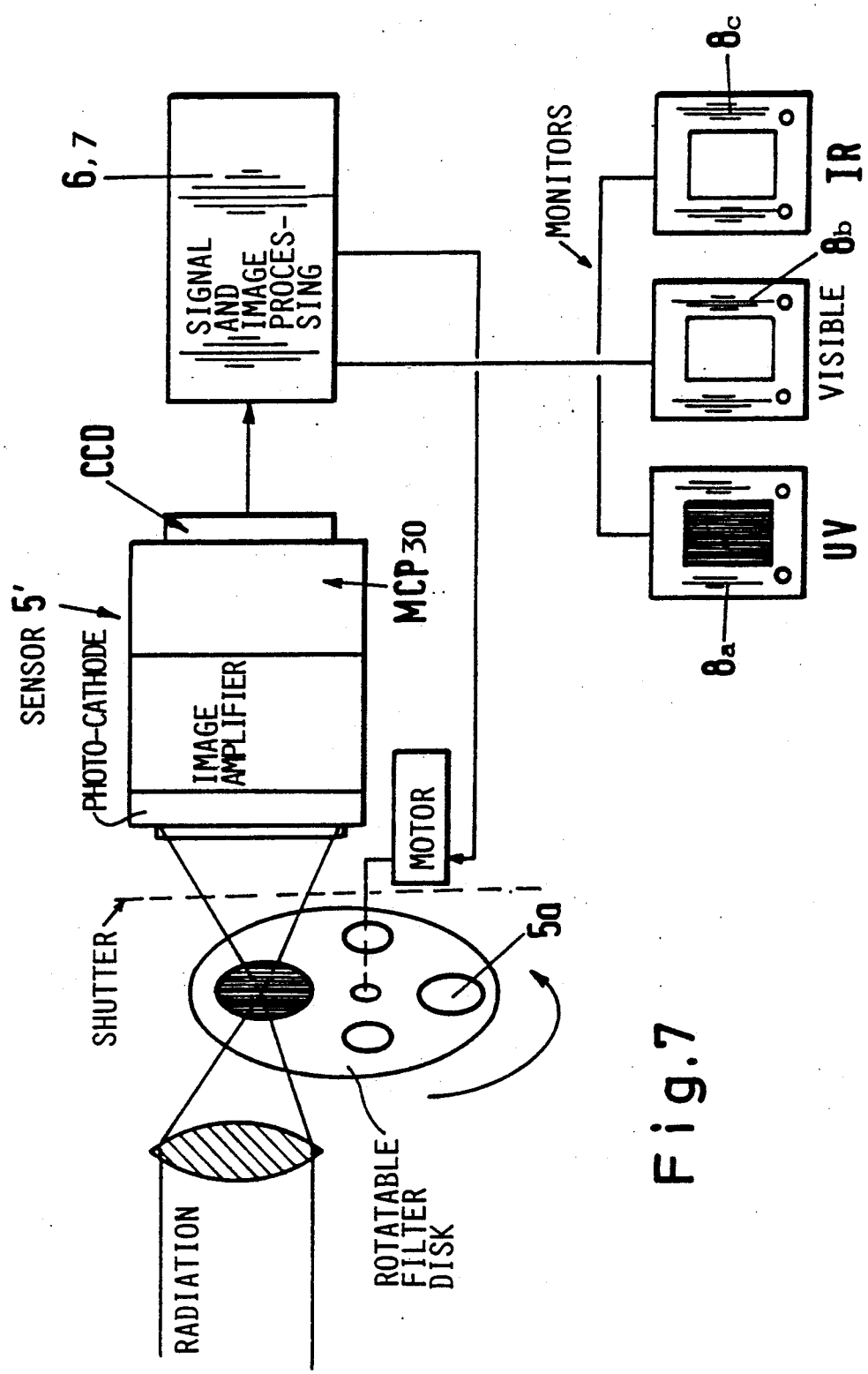
FIG. 7 illustrates the principle of an intelligent evaluation of image contents over various spectral ranges.

By means of a rotatable filter wheel with various transmitted wave length ranges and time synchronization of the fiber position with a CCD-image read-out 4a, it is possible to quasi-simultaneously display images on three separate monitors, for example on a first monitor 8a the UV-image, on a second monitor 8b the visible image, and on the third monitor 8c the IR-image, see FIG. 7.

The UV-light is then converted into visible light by an image converter 2a and is supplied to the image amplifier 3a, which is coupled at the image read-out 4a to a CCD or charge coupled device 6a for an image formation and an image read-out either directly or particularly by fiber optics 7a.

Figure 3:
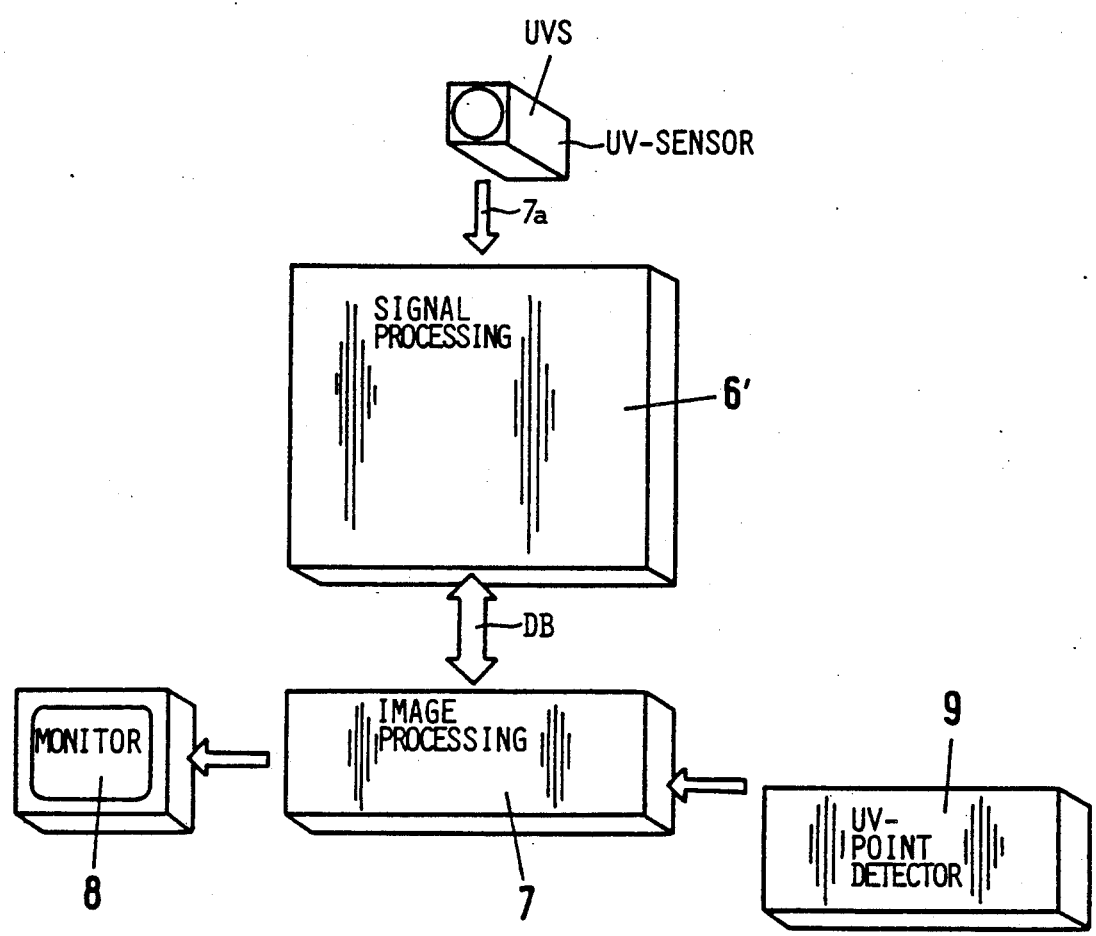
FIG. 3 shows principle components of the present flying body steering system in the form of a block diagram.

FIG. 3 shows a block diagram of the main components of the present system with the UV-sensor UVS as the image sensor, the signal processing stage 61, and the image processing stage 7 with a computer and a generator for command signals, all connected by a data bus DB. For simplification, instead of the UV-image sensor UVS, a UV-point detector 9 with an amplifier and a scanner or sampler may be connected to the computer of the image processing stage 7, and the output of the computer may output a display signal to be displayed by a monitor 8, if desired, e.g., for a control purpose. The signal line 7a of a camera such as the CCD-camera 6a shown in FIG. 2 or a video camera with its own power supply and image memory, leads to the signal processing stage 61. The control of the camera is achieved in a manner to be described below. The camera is selected to be of high quality for clocking and zooming purposes. The signal processing stage 61 comprises digital-analog outputs which are connected with the image processing stage 7 through said databus DB. The computer in the image processing stage 7 evaluates the images, displays them at 8, and recognizes the flying body 1 without interference, for example through a comparison with stored images or other initially mentioned parameters of the known flying body 1 to be steered and determines the location or position coordinates and then generates steering signals which are transmitted as commands either by a wire or a light conductor 3 or a transmitting antenna, for example, for a steering beam such as a radar or laser beam. The read-out of the image contents is advantageously achieved by means of a CCD-camera 6a which is coupled either directly or by image conversion and amplification through an optical fiber plate or by means of fiber tapers, see FIG. 4a. In a simplified embodiment it would be sufficient to make the CCD-chip UV-sensitive and to have a wide dynamic range.

As mentioned, the UV-point detector 9 can be used in FIG. 3 for simplification. The signal senses by the detector 9 is processed and evaluated similarly as heretofore for IR-single detectors. The steering can then be taken over as in known systems which operate with IR-radiators and a modulator disk. The sampling mechanism or reticle scanner can similarly be taken over, however, the infrared sensitive point detector is replaced by the ultraviolet sensitive point detector a, and an active UV-radiator 6 is used, instead of the thermal radiator located at the tail end of the flying body. For the UV-point detectors, it is preferred to use those made on a silicon or GaAs basis.

Figure 4:
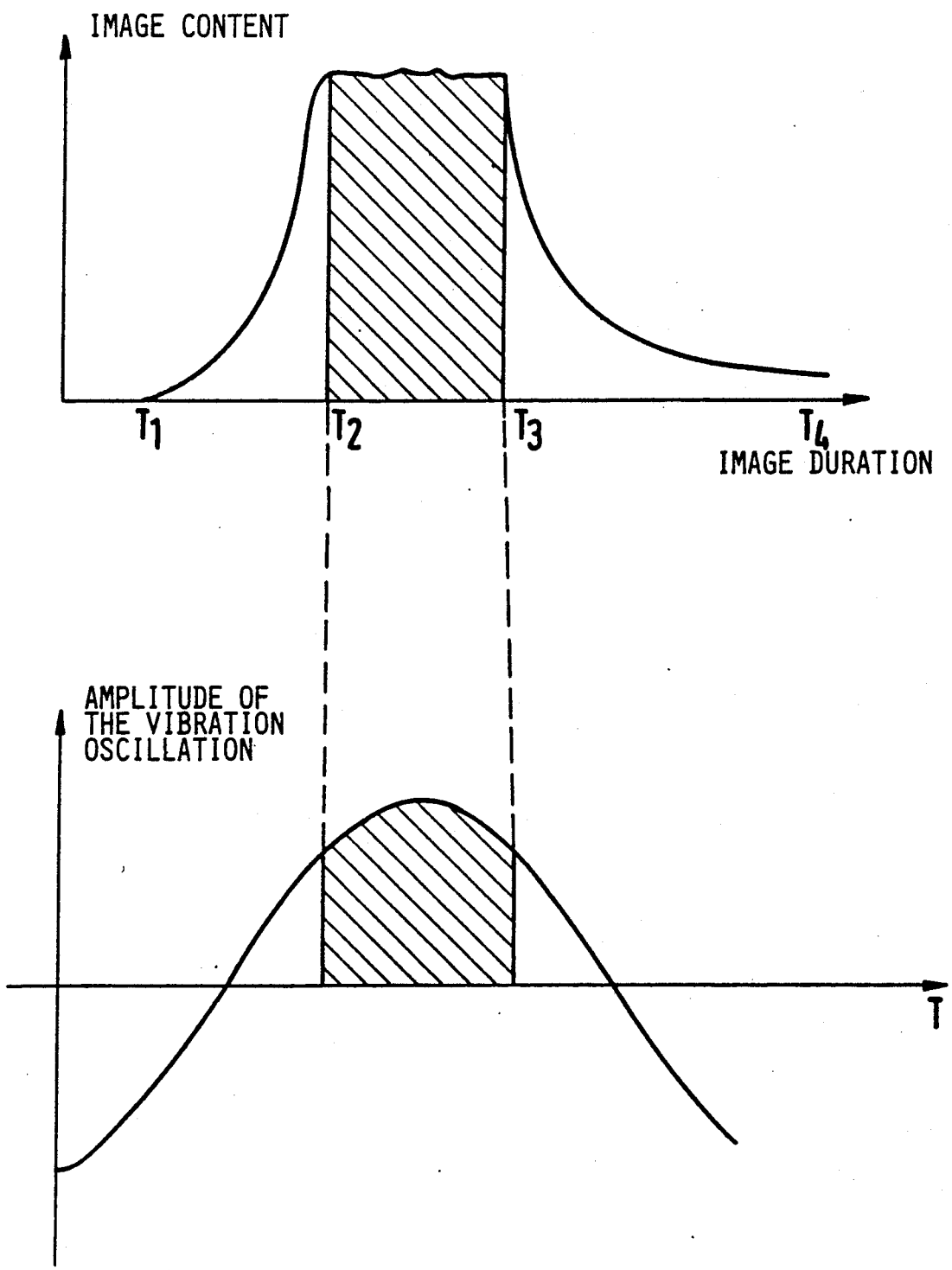
FIG. 4 shows characteristic curves for image evaluation.

FIG. 4 shows the image read-out and evaluation and the correlation of the obtained values with known oscillation patterns of flying bodies or engines which are to be recognized by comparison.

Figure 5A:
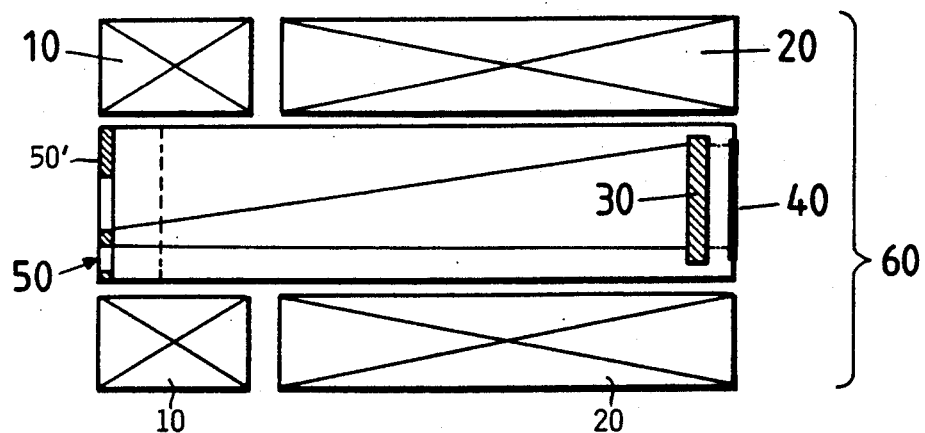
FIG. 5a shows details of an electronic zoom device for the field of view control shown as one of the blocks of FIG. 5.
Figure 5:
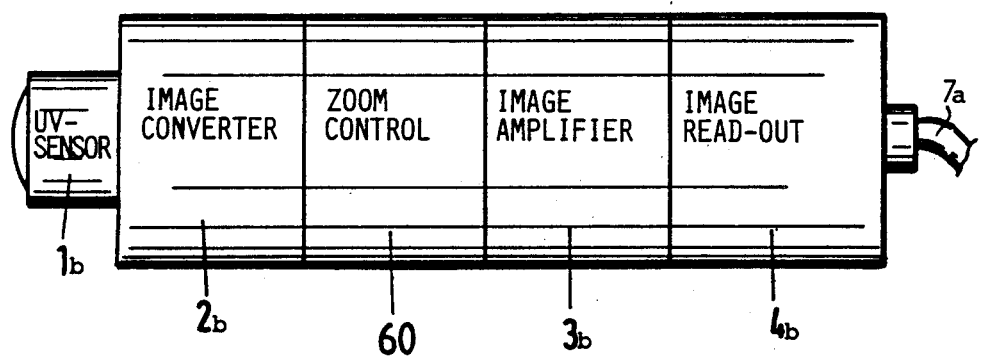
FIG. 5 shows in block form the components of a modified ground station sensor unit similar to FIG. 2, but including a field of view control.

FIG. 5 shows a modified sensor unit for the ground station, compared to FIG. 2, with an electronic zoom or field of view control 60 is additionally built into the unit of the present recognition system. The image converter 2 and the image amplifier 3b may be integrated into the zoom control 60. The UV-sensor 1b, the image read-out 4b, and the fiber optics 7a are the same as in FIG. 2.

FIG. 5a shows the electronic zoom or field of view control 60 with its electron multiplier tube 50 in more detail. The electron multiplier tube 50 includes a magnification coil 10a, focusing and deflecting coil 20 and a micro-channel plate (MCP) 30. The tube 50 further comprises a phosphor coated disk 40 at its output end and a photo-cathode 50 at its input end.

FIG 6 shows an example of the micro-channel plate 30 as used in FIGS. 5a and 6a. The plate 30 has a plurality of location-fixed amplifier channels 30'. FIG. 6a shows the electron multiplier tube 50 in a perspective view to illustrate the micro-channel plate 30 with its individual channels 30'. A lengthwise section through an individual channel 30' is shown on an enlarged scale at the bottom of FIB. 6a. The photo-cathode 50' is shown at the input end facing a radiation. The phosphorescent disk 40 is shown at the output end of the tube 50. The photocathode 50' and the MCP 30 are connected to a voltage source V. As mentioned, a filter or a filter disk with several filters, not shown, may be arranged in front of the photo-cathode 50' if the reception of a certain spectral range, even outside of the UV-spectral range, is desired.

As a variation of the above described embodiments, it is also possible to detect and evaluate several spectral ranges with several single sensors or a so-called sandwich sensor.

Another embodiment for using IR and UV single detectors can be arranged by using common input optics and beam splitting by means of dichroic mirrors, as they are used in the state of the art, particularly as resonator mirrors for lasers. The signal processing downstream of the just mentioned elements is then achieved in parallel for both sensors, namely the IR-sensor and the UV-sensor. The same applies to the quasi-real time acquisition and evaluation of steering signals which are then transmitted to the flying body as commands for maintaining a certain trajectory path or flight direction. The flying body control converts these signals in a known manner for steering the flying body, for example, by means of radar. The preferred ground device station includes a central computer operating simultaneously as a steering and command station and a launching means for the flying body. These components may also be spatially separated and the separate steps or instructions or activation may be carried out manually or semi-automatically.

When using UV-single detectors 9, the signal processing is carried out analogously to the previously practiced signal processing for IR-single detectors.

When using UV-image forming focal plane array sensors, the signal evaluation is carried out by means of an image processing computer.

The image processing computer system operates in the tracking method, which recognizes the UV-signature, determines its location coordinates, and converts these coordinates into steering signals in an appropriate form. At the launch or start of the flying body 1, the signal of the UV-signature is large and generally moves from the edge of the image to the center of the image viewing field. The UV-signature continuously becomes weaker, whereby the received power of the UV-signal determines the operating distance range of the system. The transmission range of the optical filters is tuned to the emission spectrum of the UV-radiation source 6.

If the UV-light source 6 is of a pyrotechnical or electrical type, then the emission preferably is achieved in the form of a line radiation, that is to say, narrow band filters may be used to suppress the background. This measure further improves the signal to noise ratio. A wave length range may be selected which is advantageously situated relative to the atmospheric absorption.

In connection with the invention the following advantages are additionally achieved.

Due to its special characteristics, the UV-sensor can use these advantages. Relative to the prior art, the UV-sensor in the invention achieves improved locating and ranging results or, in other words, the locating error rate is reduced. In this manner a flying body 1 or similar object, either manned or unmanned, or a projectile which is remotely steered (at least during the approach flight toward a target), achieves a greater probability of a direct hit.

Figure 8:
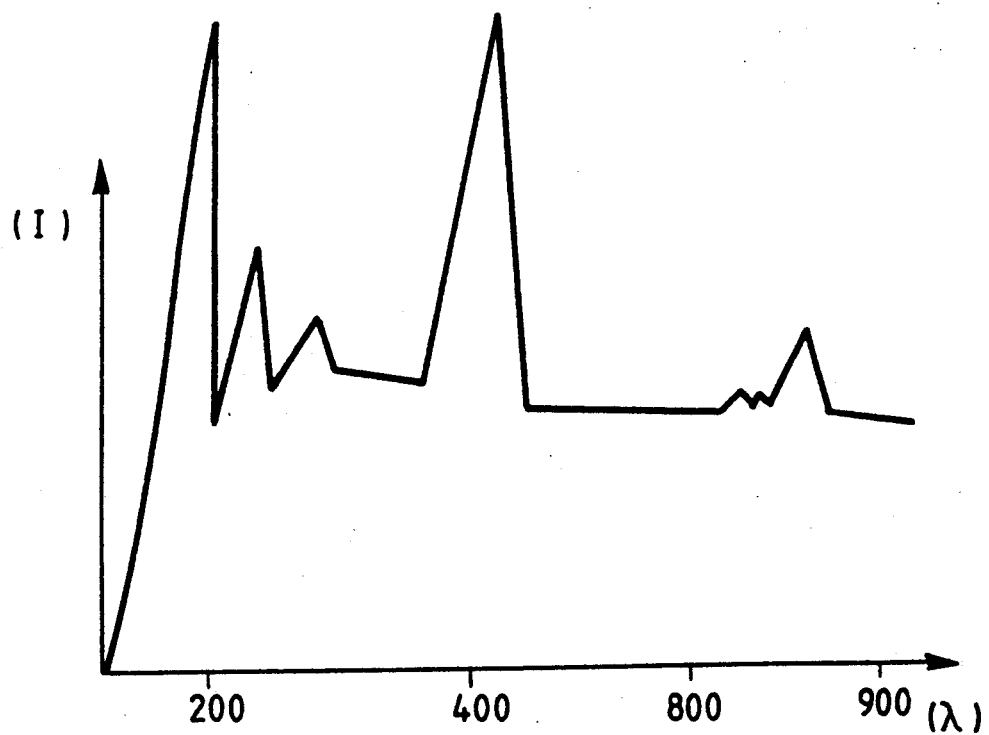
FIG. 8 shows a diagram of the sensor sensitivity and the pertinent spectral range.

In another example embodiment of the invention as shown in FIGS. 9 to 12, and described below, a multispectral sensor is provided, of which the spectral sensitivity ranges are determined by the freely selectable transmission characteristics within a very broad range of approximately 200 to 900 nm as shown in FIG. 8, especially through the use of an optical element 11 in front of the input optics. The spectral range which may be evaluated, is shown in FIG. 8, wherein the intensity of the radiation is shown on the ordinate and the wave length between 200 and 900 nm is shown on the abscissa ($\lambda$). Various intensity maxima are clearly visible as they arise in scenes to be viewed.

The photo-sensitive part of the sensor 5' in FIG. 7, is embodied as a sensor and as an amplification element, especially as a photo-cathode with an integrated image amplifier. Hence, the sensor characteristics are easily adaptable with a high dynamic range to the respective conditions of a scene. In order to illustrate this point, in the following a special case is chosen purely as an example, to allow a better understanding. The sensor 5' in FIG. 7 has a photo-cathode as the photo-sensitive part, for example type S20, sensitive from approximately 200 nm to 850 nm, and is provided with a downstream-arranged image amplifier an image read-out through CCD-sensor means. The optical element arranged in front of the radiation input optics divides the image of the scene in such a manner that three equal image scenes are imaged, displaced in parallel, onto the CCD-matrix, compare FIG. 12. If the optical element is additionally modified in such a manner that only one characteristic spectral range (UV, VIS, IR or green/ red/blue) is transmitted per image component, then the same scene will be available per image field of the video image in three different spectral ranges.

Figure 10:
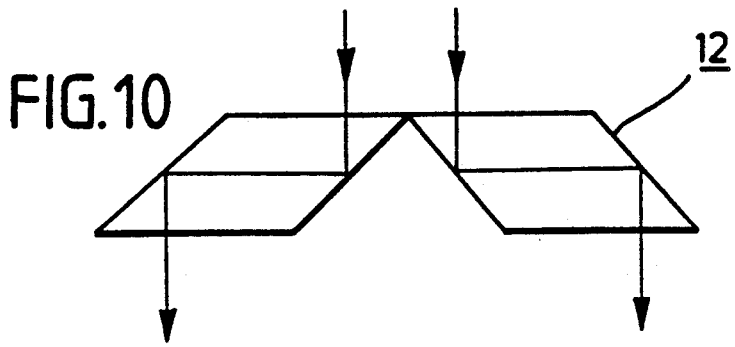
FIG. 10 is a mirror arrangement for use with the invention, especially within the optical system of FIG. 11.
Figure 11:
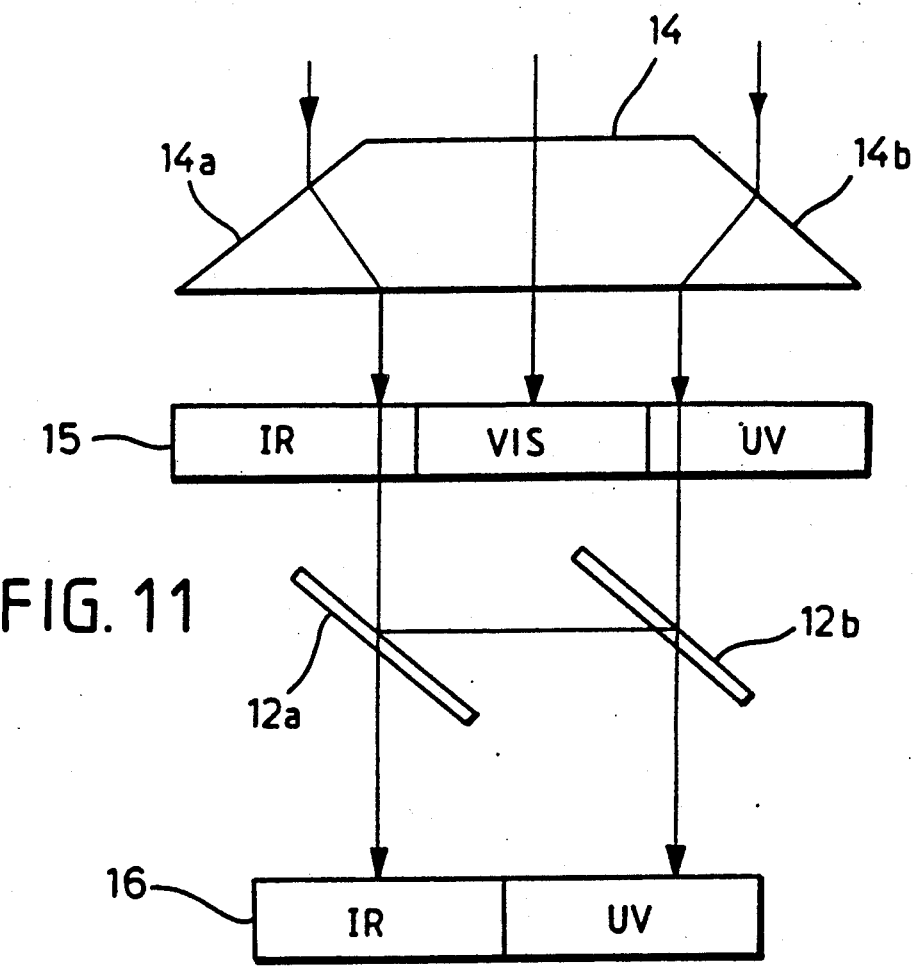
FIG. 11 is an optical system including a prism arrangement combined with a mirror arrangement.
Figure 12:
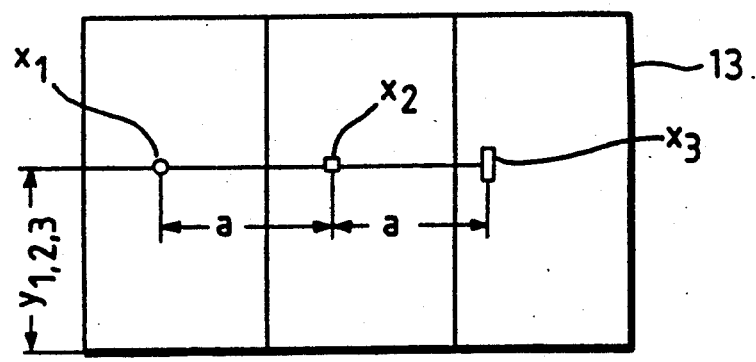
FIG. 12 is an example of an image evaluation with reference to a video image.

If a special wave length is recognized as being significant for locating and recognizing an object such as a flying body 1, then this radiation arises as a triple light point at the same times on the video image 13 shown in FIG. 12 through appropriate spectral filtering in the lens or filter arrangement and by means of mirrors as shown in FIGS. 10 and 11. This results in an unambiguous locating or ranging and recognition of an object from its spacing in the X- and Y-axes on the video image 13 and with regard to the form of the image points which correspond to an object, see $X_1$, $X_2$, and $X_3$ in FIG. 12 with the vertical spacings $Y_1$, $Y_2$, and $Y_3$. Therein, the lateral displacements of the spacings "a" are constant among the objects.

Figure 9:
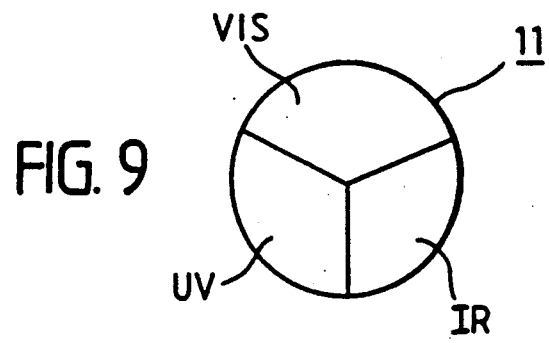
FIG. 9 shows a lens arrangement, especially a trick lens, for viewing selectively determined spectral ranges.

In this embodiment a typical trick lens 11 with various types of layers may be used as is shown, for example, in FIG. 9. The ranges, here VIS (visible), UV, IR or green/red/blue or others, may be chosen as desired, not only in sector shapes, but also with a central region. The regions can partially overlap or cover each other.

FIG. 10 shows one mirror construction 12 suitable for redirecting the light beams and selecting individual spectral ranges. The trick lens 11 shown in FIG. 9 can, for example, be used instead of the rotatable filter disk driven by a motor M shown in FIG. 7.

The mirror 12 is especially suitable for simplifying the separation of the several ranges VIS, UV, IR, in the beam path as shown in FIG. 11.

In FIG. 11 a lens or prism arrangement 14 is used as an optical element, whereby this prism is made especially of quartz or fluoride glass or other material having similarly good optical characteristics. The laterally sloped surfaces 14a and 14b are made of different selective filter layers depending upon which spectral range is desired to be evaluated. An image generator 15 and a mirror arrangement 12a and 12b are shown below the prism 14 in FIG. 11, and a selecting image generator 16 is shown downstream of the mirror arrangement 12a, 12b in the beam path. Such optical elements as beam splitters, mirrors, filters, prisms, lenses, etc., are known as such. The image evaluation is not shown, especially a dynamic evaluation and image analysis by means of a computer. This also applies for FIG. 12, where the video image 13, for example, is an image produced on a monitor aided by a computer which is not shown, in which also the algorithms for evaluating the image contents are stored. Only in this manner is an error-free recognition of the object possible over the entire flight path.

Although the invention has been described with reference to specific example embodiments, it will be appreciated, that it is intended to cover all modifications and equivalents within the scope of the appended claims.

We claim:

1. A method for steering a remote controlled moving object, whereby the object is guided away from its start by means of an electro-optical sensor system which allows locating a position and therewith the moving object on its path, and wherein signals acquired from said electro-optical sensor system are transmitted to a signal processing and evaluating circuit for correspondingly producing steering commands in a ground station, said electro-optical sensor system comprising a UV-radiation sensitive sensor in a locating and object detection and recognition system including said signal processing and evaluating circuit, and which supplies its useful signal to a guidance computer for generating said steering commands, which are transmitted to said remote controlled moving object and which commands are converted in said remote controlled moving object for its steering, whereby respectively acquired image contents are compared in said guidance computer with stored image contents with reference to known signatures, and wherein said UV-radiation sensitive sensor is an image generating sensor (CCD) which recognizes UV-radiations and, depending upon a direction of incidence, provides signals to an image processing and evaluating circuit, whereby the evaluation is carried out by means of said guidance computer for generating said steering commands, and wherein said image generating sensor (CCD) has a large dynamic range which is sensitive over a broad spectral range from UV to the near IR, wherein image contents are supplied to an image processing, preparing, and evaluating computer which has stored therein evaluating algorithms, so that previously known flying body radiation and movement characteristics lead to an unambiguous, error-free locating, especially over an entire flight path, by means of analysis of said image contents.

2. The method of claim 1, wherein a UV-radiation signature of an exhaust gas stream of an active flying body engine serves for locating of said remote controlled moving object.

3. The method of claim 2, wherein chemical additives are added to a propellant of said flying body engine for influencing in a defined manner special plume radiation characteristics representing a time-power-spectral behavior.

4. The method of claim 1, wherein in addition to an engine of said remote controlled moving object, any one of a chemical propellant composition, a pyrotechnic composition, and a flare composition is used with a high proportion of its emitted radiation in the ultraviolet spectral range.

5. The method of claim 1, wherein a current powered and controllable UV-radiation source is used on said remote controlled moving object for facilitating its locating.

6. The method of claim 5, wherein said UV-radiation source at said remote controlled moving object is time coded in its pulse duration and modulation.

7. The method of claim 1, further comprising performing a plausibility control for an object recognition.

8. An apparatus for steering a remote controlled moving object, whereby the object is guided away from its start, comprising electro-optical means for locating a position of said moving object on its path, means for transmitting signals acquired from said electro-optical means, signal processing and evaluating circuit means including a guidance computer for producing steering commands in a ground station in response to signals received from said signal transmitting means, said electro-optical means comprising a UV-radiation sensitive sensor which is blind in the solar UV-radiation range, and input optics which achieve a high resolution field of view, and wherein one or more filters are arranged in front of said UV-radiation sensitive sensor for suppressing wave length ranges of radiation not to be detected.

9. The apparatus of claim 8, wherein said electro-optical means comprise a CCD-chip, an image converter and an amplifier.

10. The apparatus of claim 9, wherein said electro-optical means further comprise an electron multiplier tube for an image generation, said multiplier tube including a micro-channel plate and a focal plane array.

11. The apparatus of claim 8, further comprising an electronic zoom.

12. The apparatus of claim 8, wherein said UV-radiation sensitive sensor is a point detector for UV-radiation.

13. The apparatus of claim 8, further comprising a rotating filter wheel with quasi-real-time depiction of a target region in different wave length ranges, and wherein respectively obtained image contents of separate spectral ranges are coupled by means of artificial computer intelligence in such a manner that an object recognition and an interference reliability are increased by means of a plausibility control.

14. The apparatus of claim 8, further comprising a plurality of UV-light sources for increasing an interference reliability during an object recognition by means of signals obtained from said UV-light sources temporally activatable in a defined manner, whereby respective signals are coupled and evaluated depending on a corresponding spectral range.

15. The apparatus of claim 8, further comprising an optical recognition unit for receiving a time coding of UV-radiation, said recognition unit demodulating and evaluating said UV-radiation in a computer aided manner.

16. The apparatus of claim 8, further comprising a night vision camera for obtaining images from residual light.

17. The apparatus of claim 8, further comprising detection means for detecting an exhaust gas stream relative to its radiation characteristics in a range from UV to near IR-light corresponding approximately to a range of 200 to 900 nm when a spacial position of said moving object and its exhaust gas stream are not considerably different from one another.

18. The apparatus of claim 17, wherein said detection means comprise an optical element located in front of input optics of said UV-sensitive sensor, whereby said optical element multiply depicts a viewed scene in an image field plane, and wherein a depiction is simultaneously carried out in a respective different spectral window.

19. The apparatus of claim 17, wherein said optical element in front of said input optics of said UV-sensitive sensor comprises at least one of a prism arrangement, a mirror beam splitter arrangement, and a lens arrangement which has spectrally selective transmission characteristics, so that a viewed scene is simultaneously depicted in at least two of a UV-range, a visible range and a near IR-wave length range, and in a color range such as green/red/blue.

20. The apparatus of claim 8, wherein said signal processing and evaluating circuit means performs image processing and evaluating of image contents in a spectrally selective, dynamical manner and in real time, relative to a known form, relative to motion dynamics, and relative to intensity characteristics and a positional correlation within various spectral windows.

21. The apparatus of claim 14, wherein said UV-light sources comprise a mercury vapor high pressure lamp operating as a current powered and controllable UV-radiation source of said remote controlled moving object.

* * * * *

UNITED STATES PATENT AND TRADEMARK OFFICE
CERTIFICATE OF CORRECTION

PATENT NO. : 4,988,058
DATED : January 29, 1991
INVENTOR(S) : Reinhard Dirscherl et al.

It is certified that error appears in the above-identified patent and that said Letters Patent is hereby corrected as shown below:

ON TITLE PAGE:

--[30] Foreign Application Priority Data
   August 25, 1988 [DE] Fed. Rep. of Germany 38 28 767 --.

Signed and Sealed this

Twenty-sixth Day of May, 1992

*Attest:*

DOUGLAS B. COMER

*Attesting Officer*   Acting Commissioner of Patents and Trademarks